(12) United States Patent
Keohane et al.

(10) Patent No.: US 7,886,339 B2
(45) Date of Patent: Feb. 8, 2011

(54) RADIUS SECURITY ORIGIN CHECK

(75) Inventors: Susann Marie Keohane, Austin, TX (US); Gerald Francis McBrearty, Austin, TX (US); Shawn Patrick Mullen, Buda, TX (US); Jessica Carol Murillo, Round Rock, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 604 days.

(21) Appl. No.: 11/625,301

(22) Filed: Jan. 20, 2007

(65) Prior Publication Data
US 2008/0178264 A1    Jul. 24, 2008

(51) Int. Cl.
G06F 7/04    (2006.01)
(52) U.S. Cl. .................. 726/3; 726/1; 726/2; 726/4; 726/5; 709/217; 709/219; 709/227; 709/229
(58) Field of Classification Search .................. 726/1–5; 709/217, 219, 227, 229
See application file for complete search history.

(56) References Cited

U.S. PATENT DOCUMENTS

| | | | | |
|---|---|---|---|---|
| 7,010,582 B1* | 3/2006 | Cheng et al. | ................. | 709/219 |
| 7,174,456 B1* | 2/2007 | Henry et al. | ................. | 713/158 |
| 7,284,062 B2* | 10/2007 | Krantz et al. | ................ | 709/229 |
| 7,610,049 B2* | 10/2009 | Watanabe | .................... | 455/436 |
| 7,716,338 B1* | 5/2010 | Sylvain | ....................... | 709/227 |
| 2003/0063593 A1* | 4/2003 | Koyanagi et al. | ........... | 370/338 |
| 2005/0021956 A1 | 1/2005 | Genty et al. | | |
| 2005/0207378 A1* | 9/2005 | Zaitsu | ........................ | 370/338 |
| 2005/0220099 A1* | 10/2005 | Igarashi | ...................... | 370/389 |
| 2005/0286489 A1* | 12/2005 | Shin et al. | ................... | 370/352 |
| 2006/0013157 A1* | 1/2006 | Annic | ........................ | 370/328 |
| 2006/0021004 A1* | 1/2006 | Moran et al. | .................... | 726/2 |
| 2006/0048212 A1* | 3/2006 | Tsuruoka et al. | ............... | 726/4 |
| 2006/0200678 A1* | 9/2006 | Yamada et al. | .............. | 713/182 |
| 2006/0236369 A1* | 10/2006 | Covington et al. | ............. | 726/1 |
| 2006/0271485 A1* | 11/2006 | McKenzie et al. | ............ | 705/51 |
| 2007/0113269 A1* | 5/2007 | Zhang | ........................... | 726/4 |

(Continued)

FOREIGN PATENT DOCUMENTS

CN    1830190 A    9/2006

OTHER PUBLICATIONS

Yanchao Zhang, A Secure Authentication and Billling Architecture for Wireless Mesh Networks, Kluwer Academic Publishers, Published online:Jun. 2006.*

(Continued)

*Primary Examiner*—Ian N Moore
*Assistant Examiner*—Gary Gracia
(74) *Attorney, Agent, or Firm*—Yee & Associates, P.C.; Justin M. Dillon

(57) ABSTRACT

A computer implemented method, apparatus, and computer program product for authenticating a user to a network. In response to receiving a request from a user to access a protected resource, the process sends a unique bit sequence into a network connection utilized by the user. Next, the process authenticates the user to access the protected resource in response to receiving a verification that the unique bit sequence was received by an access point that authenticated the user when the user logged on to the network.

11 Claims, 7 Drawing Sheets

U.S. PATENT DOCUMENTS

2007/0169178 A1* 7/2007 Keohane et al. ............... 726/4
2007/0204156 A1* 8/2007 Jeghers ..................... 713/168

OTHER PUBLICATIONS

Iuon-Chang Lin, A User Authentication system using back-propagation Network, Article: Neural Computing & Applications; 2005, vol. 14 Issue 3, p243-249, 7p.*

Rigney et al., "Remote Authentication Dial In User Service (RADIUS)", RFC 2865, Jun. 2000, pp. 1-71, http://rfc.net/rfc2865.txt.

Blunk et al., "PPP Extensible Authentication Protocol (EAP)", RFC 2284, Mar. 1998, pp. 1-15 http://rfc.net/rfc2284.txt.

Rigney et al., "RADIUS Extensions", RFC 2869, pp. 1-44, Jun. 2000 http://rfc.net/rfc2869.txt.

Mitton, "Network Access Servers Requirements: Extended RADIUS Practices", RFC 2882, Jul. 2000, pp. 1-15 http://rfc.net/rfc2882.txt.

Vollbrecht et al., "State Machines for Extensible Authentication Protocol (EAP) Peer and Authenticator", RFC 4137, pp. 1-48, Aug. 2005.

"802.1X IEEE Standard for Local and metropolitan area networks, Port-Based network Access Control", IEEE Computer Society, Dec. 13, 2004, pp. 1-169.

China Patent office action for application 2010100900646230 dated Oct. 13, 2010.

* cited by examiner

RADIUS SECURITY ORIGIN CHECK

BACKGROUND OF THE INVENTION

1. Field of the Invention

The present application is related generally to a data processing system and in particular to a method and apparatus for network security. More particularly, the present application is directed to a computer implemented method, apparatus, and computer usable program code for an origin security check to authenticate a user to a network.

2. Description of the Related Art

Currently, computer network security is of increasing importance due to the often sensitive nature of information stored on commercial and governmental network computers and databases. For example, a bank's Ethernet network computers and databases may contain customer names, account balances, bank account numbers, addresses, phone numbers, social security numbers, and other confidential and personal information. An unauthorized user may be able to access one or more of the bank's computers and/or databases locally from a computer connected to the Ethernet. The bank's computers may also be connected to a remote network, such as the Internet. In such a case, an unauthorized user may be able to obtain access to the bank's computer system remotely through the Internet network connection.

Current network security options designed to prevent an unauthorized user from obtaining unauthorized access to a LAN network include a firewall. A firewall is an information technology security device that acts as an intermediary between a network with a low trust zone, such as the Internet, and an internal network, such as an Ethernet network, with a high trust zone. A high trust zone is a zone within a network or data processing system that imposes security measures to secure data. For example, a high trust zone may require users to be authenticated with a security password. Thus, users that gain access to a high trust zone are trusted. A low trust zone typically requires minimal or no security clearance to access the zone. Therefore, users in a low trust zone are less trusted because they have not been authenticated as trusted or authorized users.

The network firewall typically prevents users in the low trust zone network from obtaining access to an internal network without a valid user authentication. A user authentication protocol typically requires a client requesting access to the network to enter a user name and password. The user name and password are verified to ensure the user is authorized to access the internal network before allowing the client to connect. Thus, the firewall is intended to prevent unauthorized access to a network.

However, if a hacker is able to breach the network firewall, the hacker may be able to sniff passwords and user names from the internal network. The hacker may then be able to log on to the internal network by using an authorized user's name and password that the hacker has commandeered. Once the hacker has gained access to the system, the hacker may be able to access sensitive information stored on the internal network.

Telnet is a terminal emulation program that is used by a client computer to connect to a server on a network. A client starts a telnet session by logging in to a server using a valid user name and password. However, telnet sessions are unencrypted. Telnet does not encrypt any data, including user names and passwords, sent over the telnet connection. Therefore, if a hacker is able to access a router, switch or gateway located on the network between the client and server using telnet, the hacker may be able to view unencrypted user names and passwords. The hacker may then use the snooped user name and password to access other protected resources.

Thus, current solutions do not provide an effective means to prevent a hacker from gaining unauthorized access to protected network resources using a valid user name and password that the hacker obtained by hacking into a network.

SUMMARY OF THE INVENTION

The illustrative embodiments provide a computer implemented method, apparatus, and computer usable program code for authenticating a user to a network. In one embodiment, the process sends a unique bit sequence into a network connection utilized by the user in response to receiving a request from a user to access a protected resource. Next, the process authenticates the user to access the protected resource in response to receiving verification that the unique bit sequence was received by an access point that authenticated the user when the user logged on to the network.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
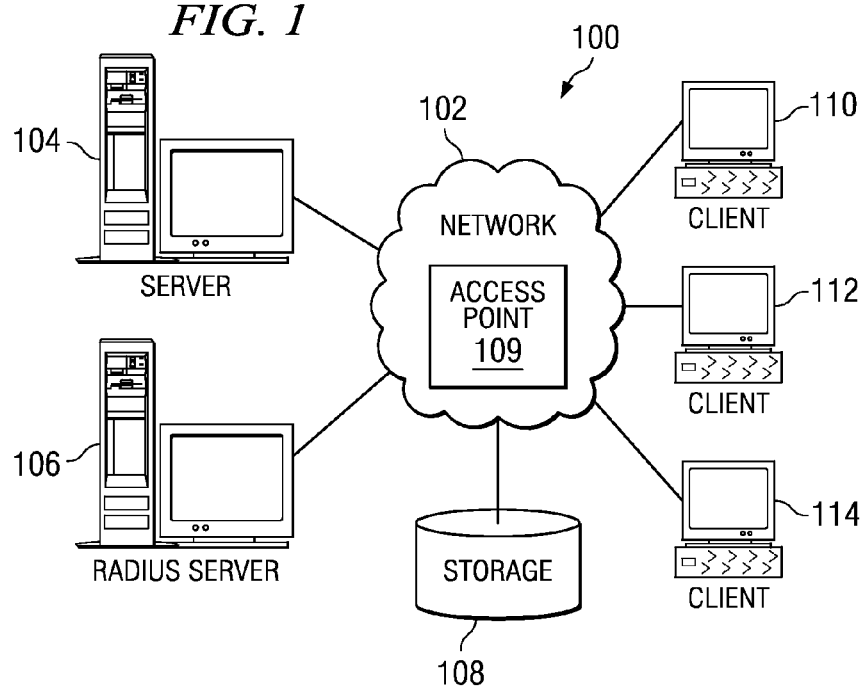
FIG. 1 is a pictorial representation of a network of data processing systems in which illustrative embodiments may be implemented.
Figure 2:
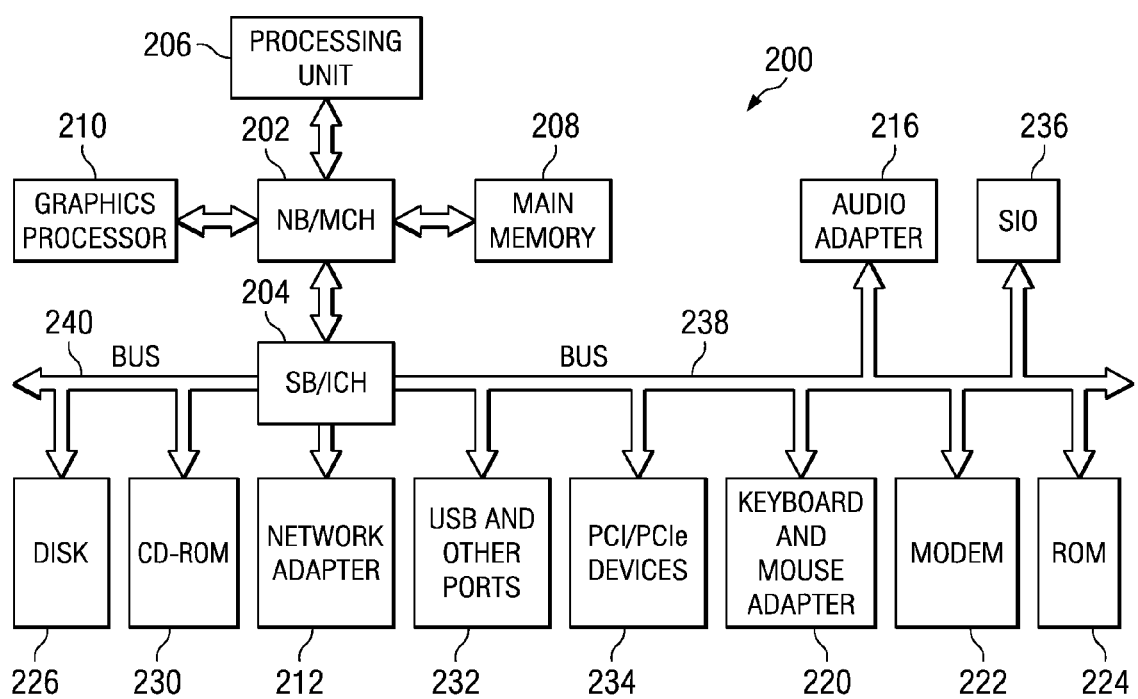
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and RADIUS server 106 connect to network 102 along with storage unit 108. RADIUS server 106 uses RADIUS standards. RADIUS is a standard that is described in Internet engineering task force (IETF) request for comments (RFC) documents, including 2865, 2284, 2869, 2882, and 4137. RADIUS is integral to wireless and wire-full authentication in which a user will log-on to a network.

RADIUS server 106 is a remote authentication dial-in user service server to authenticate a user login requesting access to a network. A user login typically includes a user name and password. A user login may also include, but is not limited to, a fingerprint scan, a voice recognition, a security policy, or any other known or available means for authenticating an authorized user.

RADIUS server 106 implements an authentication, authorization, and accounting system protocol to verify the validity of a user login. For example, RADIUS server 106 receives the requesting user's password and user name from a network access point, such as access point (AP) 109. RADIUS server 106 then verifies if the user name and password are valid. If the user name and password is valid, RADIUS server 106 authorizes access to the network or ISP system.

AP 109 is a device that connects two or more computing devices, display devices, printers, telephones, and any other wired or wireless devices to a network, such as network 102. For example, AP 109 may be, but is not limited to, a wireless access point router.

A user generally requests access to network 102 from a client computing device, such as clients 110, 112, and 114. In this example, clients 110, 112, and 114 are connected to network 102 through AP 109. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). For example, network data processing system 100 may include an Ethernet network. FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

A computer network can include, but is not limited to, any combination of computers, display devices, printers, data storage devices, and any other computer related hardware and software connected by telecommunications equipment or cable. A local area network (LAN) is a network of computers located in relatively close proximity to one other. For example, the computers and computer equipment in a LAN may be located within a single building. An example of a LAN is an Ethernet network. A wide area network (WAN) is a network that may span a relatively large geographic area. For example, the individual computers in a WAN may be located hundreds or thousands of miles apart. An example of a WAN, is the Internet.

A user accesses a network by means of an access point, such as AP 109 in FIG. 1. In a wireless network, a user at a client computer requests access from a wireless access point (WAP). The AP may require the user to enter a user login, such as a user name and password, before allowing the client to connect. However, every access point (AP) cannot be loaded with the valid login of every authorized user and employee. Therefore, the AP contacts a remote authentication dial-in user service (RADIUS) server to authenticate the user login.

For example, when an IBM® employee's laptop contacts a WAP to access an IBM® internal network, the laptop transmits the employee's IBM® intranet password and user ID to the WAP. The WAP contacts the RADIUS server, which determines if the user name and password are valid. If the user name and password are valid, the RADIUS server authenticates the user. If the user name and password are not valid, the RADIUS server does not authenticate the user. The RADIUS server informs the AP of the success or failure of the authentication. If the authentication is successful, the AP grants the user's laptop access to the network and assigns an IP address to the laptop.

Likewise, a network access server (NAS) is a point of access to a remote resource, such as a computer, printer, or data storage device. A client at a computer requests access to connect to the network. The client is typically required to enter a login, such as a user name and password or other authorizing information. The NAS itself does not contain information regarding valid user login information. Therefore, the NAS sends the requesting client's login information to a RADIUS server for verification. If the RADIUS server verifies the user's login, the NAS permits the client to connect and access the protected resource. However, if a hacker breaches the firewall or otherwise obtains a valid login, such as a user name and password assigned to an authorized user, by hacking into the network, the hacker can obtain access to the network even though the hacker is not an authorized user.

Therefore, the illustrative embodiments provide a computer implemented method, apparatus, and computer program product for authenticating a user to a network. In one embodiment, the process sends a unique bit sequence into a network connection utilized by the user in response to receiving a request from a user to access a protected resource. Next, the process authenticates the user and allows the user to access the protected resource in response to receiving a verification that the origin security check package was received by an access point that authenticated the user when the user logged on to the network.

In another embodiment, a protected resource sends an Internet protocol address used by a user requesting access to the protected resource to an authentication server. In response to receiving the Internet protocol address the authentication server retrieves a user name and password pair used by the Internet protocol address. The authentication server sends login information used by the user assigned to the Internet protocol address. In response to receiving the login information, the protected resource authenticates the user using the login information. In this example, the login information is a user name and password pair. However, in accordance with the illustrative embodiments, login information may include any information for authenticating a user. For example, login information can include a user identifier, a security protocol, a fingerprint scan, a voice print, or any other information to authenticate a user.

Figure 3:
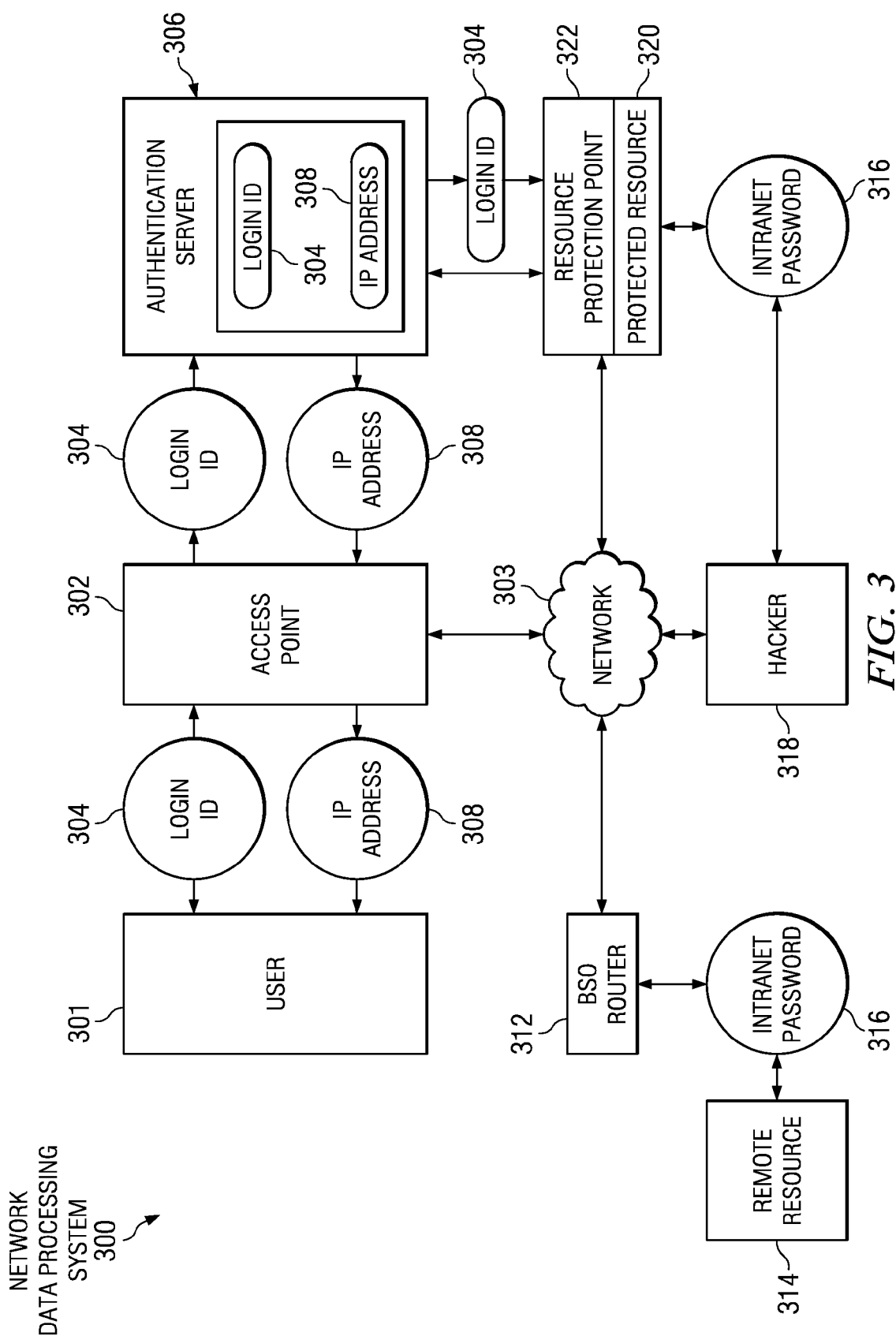
FIG. 3 is a block diagram illustrating a dataflow when a security origin check is performed in accordance with an illustrative embodiment.

FIG. 3 is a block diagram illustrating a dataflow when a security origin check is performed in accordance with an illustrative embodiment. Network data processing system 300 is a network of two or more computing devices connected to form a network, such as network data processing system 100 in FIG. 1.

User 301 is a user at a computing device requesting access to a network from access point 302. Access point 302 is any device for allowing a user to connect to a network, such as access point 109 in FIG. 1. Access point 302 may include, but is not limited to, a router, a wireless access point, a network access point, and/or a wire-full access point.

Network 303 is any type of network, including but not limited to, a wide area network, a local area network, the Internet, an Intranet, an Ethernet, or any combination of network types. For example, network 303 may include a network such as network 102 in FIG. 1. In this example, network 303 is a corporate Intranet. An Intranet is an internal, private, commercial network. Only authorized users and authorized employees of the corporation may be allowed to access the Intranet.

In this example, access point 302 does not provide open access to network 303. Therefore, access point 302 prompts user 301 to provide login ID 304 for authentication before user 301 is allowed to connect to network 303. Login ID 304 is any user name, password, digital signature, and/or any other means for authenticating a user as a user or employee authorized to access a private network. In this example, login ID 304 is a user name and password.

Access point 302 may not store every user name and password for every user authorized to connect to network 303, therefore, user 301 directly authenticates to authentication server 306. In other words, user 301 sends login ID 304 directly to authentication server 306 by means of a network connection to authentication server 306 provided by access point 302. This authentication of user 301 by authentication server 306 to enable user 301 to initially connect to network 303 can be referred to as primary RADIUS authentication.

Authentication server 306 is a server for authenticating a user login ID. Authentication server 306 is any server implementing an authentication protocol for authenticating users. In this example, authentication server 306 is a RADIUS server, such as RADIUS server 106 in FIG. 1.

If login ID 304 is a valid login ID, authentication server 306 assigns Internet protocol (IP) address 308 to user 301 and sends IP address 308 to access point 302. An IP address is a unique address assigned to a computer or other device on a network that network devices use to identify and communicate with each other.

IP address 308 assigned to user 301 by authentication server 306 uniquely identifies a computing device utilized by user 301 in network 303 for as long as the computing device is connected to network 303. In other words, if user 301 is using a laptop computer to access network 303 at access point 302, IP address 308 uniquely identifies the laptop computer and associates the laptop computer with login ID 304 for as long as the laptop computer is connected to network 303 through an access port at access point 302. Each time a user logs off network 303 and then re-connects to network 303, a different IP address may be assigned to that user. However, the same IP address is not assigned to more than one device on the network at any given time. Thus, IP address 308 is unique to network 303. IP address 308 is used to identify a computing device used by user 301 on network 303. In this example, network 303 is an internal Intranet network. However, in a different example, IP address 308 may be used to uniquely identify a computing device in any type of network, including but not limited to, the Internet, an Intranet, an Ethernet, or any other type of network.

Authentication server 306 saves login ID 304 and IP address 308 for every user that authentication server 306 authenticates. In this example, authentication server 306 stores the user name, user password, and IP address 308 for user 301. The saved login ID 304 and IP address 308 may be used by authentication server 306 during subsequent secondary authentications of user 301.

Boundary Service Offering (BSO) router 312 is a device for forwarding data packages between networks. BSO router 312 is located at a gateway between network 303 and remote resource 314 located on a different network. Remote resource 314 is a resource in a local network associated with BSO router 312. In this example, BSO router 312 is a Cisco® product.

BSO router 312 protects resources attached to BSO router 312's local network by requiring login authentication of a user before granting the user access to the local network.

Remote resource 314 is any resource on a network. For example, remote resource 314 could include a computer, a database, an application, a printer, or any other device or resource accessible through BSO router 312. Remote resource 314 contains protected, private, and/or confidential data. BSO router 312 protects remote resource 314 from access by unauthorized users by requiring a user to provide an authentication, such as Intranet password 316, to access the local network in which remote resource 314 is located.

For example, BSO router 312 could be a router that protects access to a lab containing two or more machines that contain unreleased software. In this example, BSO router 312 is protecting the group of machines located in the lab. The group of machines includes remote resource 314. A user must log on to BSO router 312 and provide a valid Intranet password, such as Intranet password 316, to obtain access to one or more machines in the lab, including remote resource 314.

User 301 connects to BSO router 312 by telnet. Telnet is a protocol for establishing a connection between two hosts. However, telnet sessions are unsecured. In other words, user names and passwords that are transmitted over telnet are unencrypted.

When user 301 requests access to remote resource 314, BSO router 312 prompts user to enter a valid user login, such as a user name and/or Intranet password 316 to authenticate user 301. Intranet password 316 could be the same password as used in login ID 304. However, Intranet password 316 may also be a different password than a password used in login ID 304.

Even when user 301 authenticates through BSO router 312, the telnet target machine, such as remote resource 314, will also ask for a valid login, such as a user name and password. The telnet target machine may also request a RADIUS secondary authentication of user 301.

However, because telnet sessions are unencrypted, Intranet password 316 is transmitted across the network connection in the clear. Hacker 318 may be able to obtain Intranet password 316 by hacking into the telnet connection. Hacker 318 may then use Intranet password 316 to obtain access to protected resources. In this example, hacker 318 is any user attempting to gain unauthorized access to a network, such as network 303.

If hacker 318 uses snooped Intranet password 316 to access a protected resource, such as protected resource 320 or remote resource 314, the protected resources accessed through a telnet session cannot tell if a hacker or other malicious network snoop is originating from an authorized computing device and network port assigned to user 301 for this particular login session.

This vulnerability exists for authentication with BSO router 312, but also when user 301 telnets to a machine. In both these cases, a password and login entered by user 301 is sent over the corporate network in clear, unencrypted text. The password and login are also transmitted in the clear when user 301 uses telnet to connect to one machine and then authenticates to DCE (Distributed Computing Environment), advanced file system (FSA), global storage architecture (GSA) or any other distributed method of obtaining data. Therefore, protected resource 320 sends an origin security check package through the network connection utilized by user 301 to authenticate the origin of the user's connection, and verify the user is located at an authenticated computing device and a correct access point port for the authorized user. In this example, the origin security check package is a unique bit sequence. The unique bit sequence is a random sequence of bits. The sequence of bits may be the length of the connection stream maximum transmission unit (MTU). For example, if the MTU size is 512 bytes, the unique bit sequence may be a random bit sequence of 512 bytes. The unique bit sequence may be a bit sequence of any length selected by a user. The length of the bit sequence may be of a sufficient length to enable a unique bit sequence to be generated. In other words, if the bit sequence is long enough, it is statically unlikely that the bit sequence will be duplicated in any other data packet being transmitted over the network connection during a predetermined time interval. The unique bit sequence may be generated using any known or available means for generating a unique bit sequence.

Thus, in this illustrative example, user 301 attempts to connect to a network at access point 302. Access point 302 prompts user 301 to enter login ID 304. Access point 302 sends login ID 304 to authentication server 306 for direct authentication by authentication server 306.

In response to receiving a user name and password from access point 302, authentication server 306 determines whether the user name and password are valid. If an authentication is not received from authentication server 306 within a predetermined period of time, access point 302 will deny user 301 access to the network. In other words, user 301 will not be allowed to connect to the network at access point 302.

If the user name and password are valid, authentication server 306 sends an authentication of the user name and password to access point 302. The authentication includes IP address 308 assigned to user 301 to uniquely identify a computing device utilized by user 301 to connect to the network. Thus, user 301 is authenticated directly by authentication server 306 when user 301 initially logs on to network 303. This may be referred to as the primary RADIUS authentication of user 301. In this example, primary RADIUS authentication of user 301 is performed using any known or available means for authenticating a user by a RADIUS server.

Authentication server 306 saves login ID 304 and IP address 308 assigned to user 301. Therefore, authentication server 306 knows the network access point and IP address from which user 301 is currently accessing the network. The login ID 304 and IP address 308 may be used by authentication server 306 to identify a network access point origin for user 301.

In this case, authentication server 306 knows that user 301 connected to the network at a network port on access point 302. Authentication server 306 also knows login ID 304 for user 301, and IP address 308 assigned to user 301. This information can be used to ensure that user 301 can only be authenticated to other network services through, or from this singular RADIUS authentication port.

In response to receiving the authentication, access point 302 allows user 301 to connect to the network. While user 301 is connected to network 303, user 301 requests resource protection point 322 to establish a telnet session to enable user 301 to access remote resource 314. Resource protection point 322 is any resource protection point to access a protected database, a login authentication to a protected resource, or any authentication point. Resource protection point 322 may also include the telnet point itself. Resource protection point 322 may also be a BSO router, such as BSO router 312. However, resource protection point 322 is not required to include a BSO router. Upon authenticating Intranet password 316, resource protection point 322 establishes a telnet session for user 301 to access remote resource 314.

In one embodiment, resource protection point 322 authenticates user 301 by authentication server 306. Authentication server 306 authenticates that the source IP address of user 301 is associated with the user ID entered by user 301 at resource protection point 322 and/or protected resource 320. In other words, before being granted access to protected resource 320, user 301 is prompted to enter a user name and password at resource protection point 322 and/or protected resource 320. Authentication server 306 authenticates that the user name and password correspond to an IP address assigned to the user name and password.

In another embodiment, the protected resource, such as remote resource 314, validates the user ID and password via the protected resource's own authentication mechanism. In this example, the protected resource may apply the user ID and password pair returned to the protected resource by authentication server 306 to the protected resource's own authentication mechanism. Therefore, the user would not be required to retype the user ID and password pair. This authentication mechanism of the protected resource may include any known or available mechanism or process for authenticating a user.

Thus, in this example, hacker 318 obtains Intranet password 316 and uses Intranet password 316 belonging to user 301 to request access to protected resource 320. Protected resource 320 queries authentication server 306. The query asks authentication server 306 if the network connection utilized by hacker 318 is coming from IP address 308. The query also asks authentication server 306 whether hacker 318 is assigned to IP address 308. However, because hacker 318 has used a stolen user name and password and used telnet to connect with protected resource 320, authentication server 306 may not be able to determine whether the network connection is coming from IP address 308, and if hacker 318 is assigned to IP address 308.

If authentication server 306 is unable to verify the network connection utilized by hacker 318 came from IP address 308, protected resource 320 sends a notice 417 to authentication server 306. Notice 417 states that protected resource 320 is about to inject a unique network bit sequence into the network connection utilized by hacker 318. Protected resource 320 then injects the origin security check package into the connection.

Authentication server 306 sends a notice to access point 302, informing access point 302 that protected resource 320 is injecting an origin security check package into the network connection. Access point 302 will then monitor the network connection for the origin security check package for a predetermined period of time.

If access point 302 identifies or detects the origin security check package headed towards the computing device utilized by user 301, access point 302 removes or drops the origin security check package, and informs authentication server 306 that the origin security check package sent by protected resource 320 was indeed headed toward the correct user authenticated computing device. Authentication server 306 then sends an authorization to protected resource 320 informing protected resource 320 that the user requesting access is authenticated. Protected resource 320 then allows the user to connect and access the protected resource.

However, in this example, hacker 318 is requesting access to protected resource 320. Therefore, when protected resource 320 sends an origin security check package into the network connection utilized by hacker 318, the origin security check package will not head towards the user authenticated computing device used by user 301. Instead, the origin security check package will head for an unauthenticated computing device used by hacker 318. Therefore, access point 302 will not see or detect the origin security check package heading towards the authenticated computing device used by user 301 within a predetermined period of time. Therefore, access point 302 will not send an authorization to authentication server 306, and authentication server 306 will not send verification to protected resource 320.

When protected resource 320 fails to receive an authorization from authentication server 306 indicating that the origin security check package was headed for the correct authenticated computing device associated with IP address 308 and user 301, protected resource 320 will deny hacker 318 access to protected resource 320. In other words, protected resource 320 will recognize hacker 318 is using a password and IP address assigned to user 301 and prevent hacker 318 from accessing resources on protected resource 320.

In this example, the user authenticated computing device is a laptop computer. However, a user authenticated computing device can be any type of known or available computing device, including, but not limited to, a desktop computer, a PDA, a cellular telephone, a tablet PC, or any other type of computing device.

In another embodiment, when user 301 requests access to protected resource 320 from resource protection point 322, resource protection point 322 and/or protected resource 320 does not prompt user 301 to enter a user login for authentication. Instead, resource protection point 322 sends an IP address for user 301 to authentication server 306. In other words, each time a user connects to protected resource 320 for access, resource protection point 322 for the protected resource contacts authentication server 306 and sends a query. The query from resource protection point 322 states that a user at an IP address, such as IP address 308, is requesting access to the protected resource. IP address 308 may be an IP address such as 9.4.4.4. Authentication server 306 looks up login ID 304 used by IP address 308 for user 301. In this example, login ID 304 is a user ID and password pair. Authentication server 306 sends login ID 304 to resource protection point 322 for protected resource 320. Authentication server 306 saved the user name and password pair used by IP address 308 during the primary RADIUS authentication procedure. Authentication server 306 returns the user name and password pair used by IP address 308 to resource protection point 322. The user name and password pair is transmitted in an encrypted format.

When resource protection point 322 receives the user name and password pair from authentication server 306, resource protection point 322 allows user 301 to connect to protected resource 320 without user 301 entering the user name and password pair. In this manner, each time a user connects to remote resource 314 through BSO router 312, or connects to protected resource 320 through resource protection point 322, the user name and password is not transmitted in the clear over a telnet connection.

Resource protection point 322 and/or protected resource 320 applies the user name and password pair received from authentication server 306 to the resource protection point and/or protected resource's own authentication mechanisms. Resource protection point 322 and/or protected resource 320 do not require user 301 to enter the user name and password pair. Thus, user 301 can connect to protected resource 320 without reentering the same user name and password each time the user connects to a different protected resource. This process may be referred to as a single sign-on feature.

Figure 4:
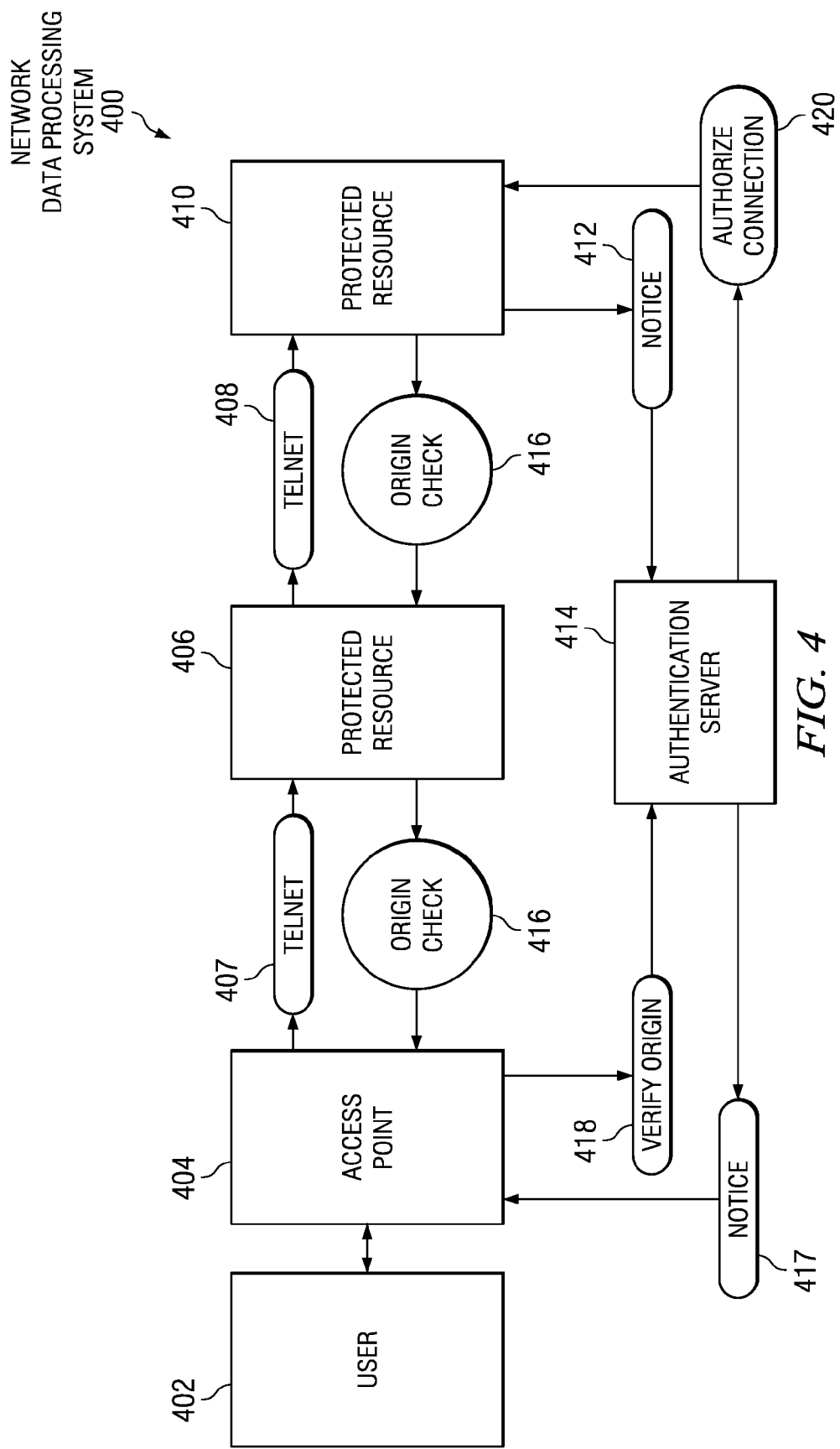
FIG. 4 is a block diagram illustrating a data flow when an origin security check package is injected into a network connection in accordance with an illustrative embodiment.

FIG. 4 is a block diagram illustrating a data flow when an origin security check package is injected into a network connection in accordance with an illustrative embodiment. Network data processing system 400 is a network of two or more computing devices connected to form a network, such as network data processing system 100 in FIG. 1. The network may include a wide area network, a local area network, the Internet, an Intranet, or any combination of network types.

User 402 is a user at a computing device requesting access to a network from access point 404. Access point 404 is any device for allowing a user to connect to a network, such as access point 109 in FIG. 1 or access point 302 in FIG. 3. Protected resource 406 and 410 are protected resources, such as protected resource 320 in FIG. 3.

Authentication server 414 is a server for authenticating a user login ID. Authentication server 414 is any server implementing an authentication protocol for authenticating users. In this example, authentication server 414 is a RADIUS server, such as RADIUS server 106 in FIG. 1 and authentication server 306 in FIG. 3.

Thus, in this example, user 402 connects to a network at a port on access point 404. Access point prompts user 402 to enter a user name and/or password before allowing user 402 to access the network. Access point 404 transmits the user name and password entered by user 402 to authentication server 414 for authentication.

After user 402 is authenticated and connected to the network, user 402 uses telnet 407 to connect to protected resource 406 from access point 404. User 402 then uses telnet 408 to establish a connection between protected resource 406 and protected resource 410, and requests access to protected resource 410.

Protected resource 410 sends a query to authentication server 414 asking whether the network connection used by user 402 is coming from an authenticated computing device. However, because user 402 has engaged in two telnet sessions to reach protected resource 410, authentication server 414 may not be able to determine if the network connection originated from an authenticated computing device connected to a port at access point 404.

Therefore, protected resource 410 sends notice 412 to authentication server 414. Notice 412 informs authentication server 414 that protected resource 410 is going to inject an origin security check package into the network connection utilized by user 402. Protected resource 410 then injects origin check 416 into the connection. Origin check 416 is an origin security check package.

In this example, origin check 416 is a unique network bit sequence. The unique network bit sequence may be a random sequence of bits the length of the connection streams maximum transmission unit (MTU). The MTU may be any MTU value. Generally, the MTU value is 512 bytes. The MTU is part of the TCP/IP protocol.

Authentication server 414 sends notice 417 to access point 404. Notice 417 informs access point 404 that protected resource 410 is injecting an origin security check package into the network connection. Access point 404 then begins monitoring network connection for the origin security check package.

Access point 404 detects origin check 416 within a predetermined period of time. The predetermined period of time is any user definable amount of time. The predetermined period of time may also be a default or predefined amount of time.

Access point 404 sends verify origin 418 message to authentication server 414. Verify origin 418 message verifies that the origin security check package was detected heading for an authenticated computing device for user 402 at a port on access point 404. Authentication server 414 then sends authorize connection 420 message to protected resource 410. Authorize connection 420 informs protected resource 410 that the origin security package was headed for an authenticated computing device at a correct port on access point 404. Therefore, the origin of the network connection utilized by user 402 is authenticated. Protected resource 410 then allows user 402 access to access protected resource 410.

In accordance with this embodiment, if access point 404 did not detect origin check 416 within the predetermined period of time, access point 404 would not have sent notice 412 to authentication server 414. Likewise, authentication server 414 would not have received verify origin 418 within a predetermined period of time. Therefore, authentication server 414 would not have sent authorize connection 420 message. In this example, when protected resource 410 did not receive authorize connection 420 message within a predetermined period of time, protected resource 410 would not allow user 402 to access protected resource 410.

Thus, a RADIUS server can check the name and password of a user. In addition, the RADIUS server can also check that an IP address used by the user is a correct IP address assigned to an authenticated computing device connected to a port on an access point. Therefore, even if a hacker is able to obtain a correct user name and password to log on to a protected resource, the RADIUS server will not authenticate the user if the user is not using the correct IP address. In other words, if the user's connection is not coming from an authenticated computing device identified by the IP address used by a user, the RADIUS server will not authenticate the user and the user will not be granted access to the protected resource.

In this embodiment, authentication server 404 checks a user login name, password, and IP address. In another embodiment, the authentication server can also check a security policy for accessing a resource. A security policy defines when and how a user can access a protected resource. If a security policy requires a user to access a network from a particular building or office in a building, the authentication server will not grant the user access to a protected resource if the IP address is assigned to a computing device that is not located in the correct building and/or office. In other words, if the user is accessing the network through a remote firewall, such as over the Internet, the authentication server will not grant the user access if the security policy requires the user to access the internal private LAN network from a local computer connected directly into the LAN network.

Figure 5:
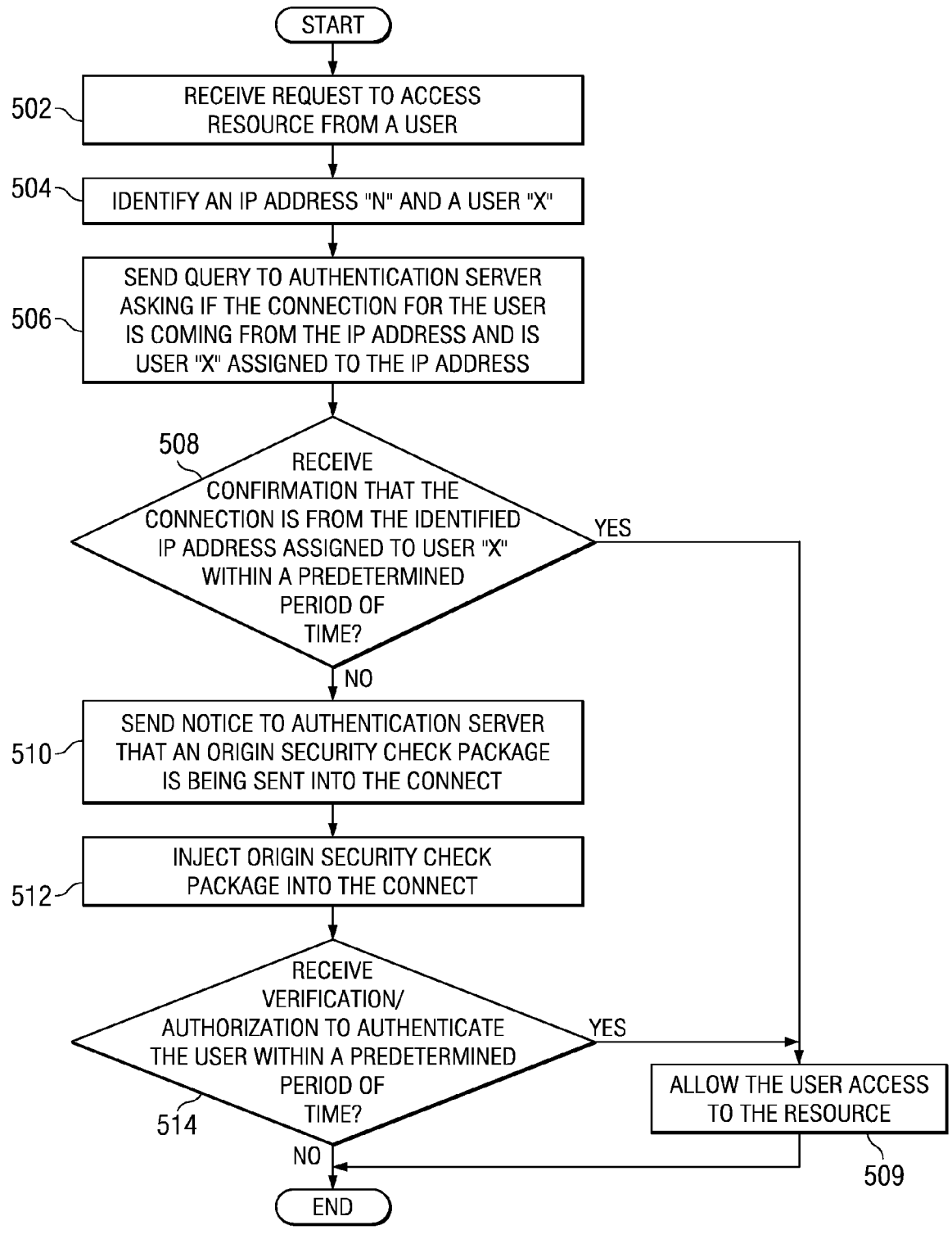
FIG. 5 is a flowchart illustrating a process for performing a security origin check by a protected resource in accordance with an illustrative embodiment.

FIG. 5 is a flowchart illustrating a process for performing a security origin check by a protected resource in accordance with an illustrative embodiment. In this illustrative example shown in FIG. 5, the process is performed by a software component for performing an origin security check, such as protected resource 320 of FIG. 3 and/or protected resource 406 or 410 in FIG. 4.

The process begins by receiving a request to access a protected resource from a user (step 502). The process identifies an Internet protocol (IP) address N and a user "X" requesting access (step 504). The process sends a query to an authentication server requesting a reply as to whether the connection for the user is coming from the identified IP address "N" assigned to user "X" within a predetermined period of time (step 506).

The process makes a determination as to whether a confirmation is received within a predetermined period of time that the connection is coming from the identified IP address and the IP address is assigned to user "X" (step 508). If the process determines that the connection is coming from the identified IP address "N" assigned to user "X," the process allows the user access to the resource (step 509) with the process terminating thereafter.

Returning to step 508, responsive to a determination that a confirmation is not received within a predetermined period of time, the process sends a notice to the authentication server that an origin security check package is being sent into the network connection (step 510). The origin security check package may be a unique bit sequence.

Next, the process injects the origin security check package into the connection (step 512). The process makes a determination as to whether a verification or authorization is received within a predetermined period of time that authenticates the user (step 514). As used herein, a predetermined period of time may include a user defined period of time. The predetermined period of time may also include a preset or default period of time.

If a verification or authorization is not received within the predetermined period of time, the process terminates thereafter. If a verification or authorization is received within the predetermined period of time, the process allows the user to access the protected resource (step 509) with the process terminating thereafter.

Figure 6:
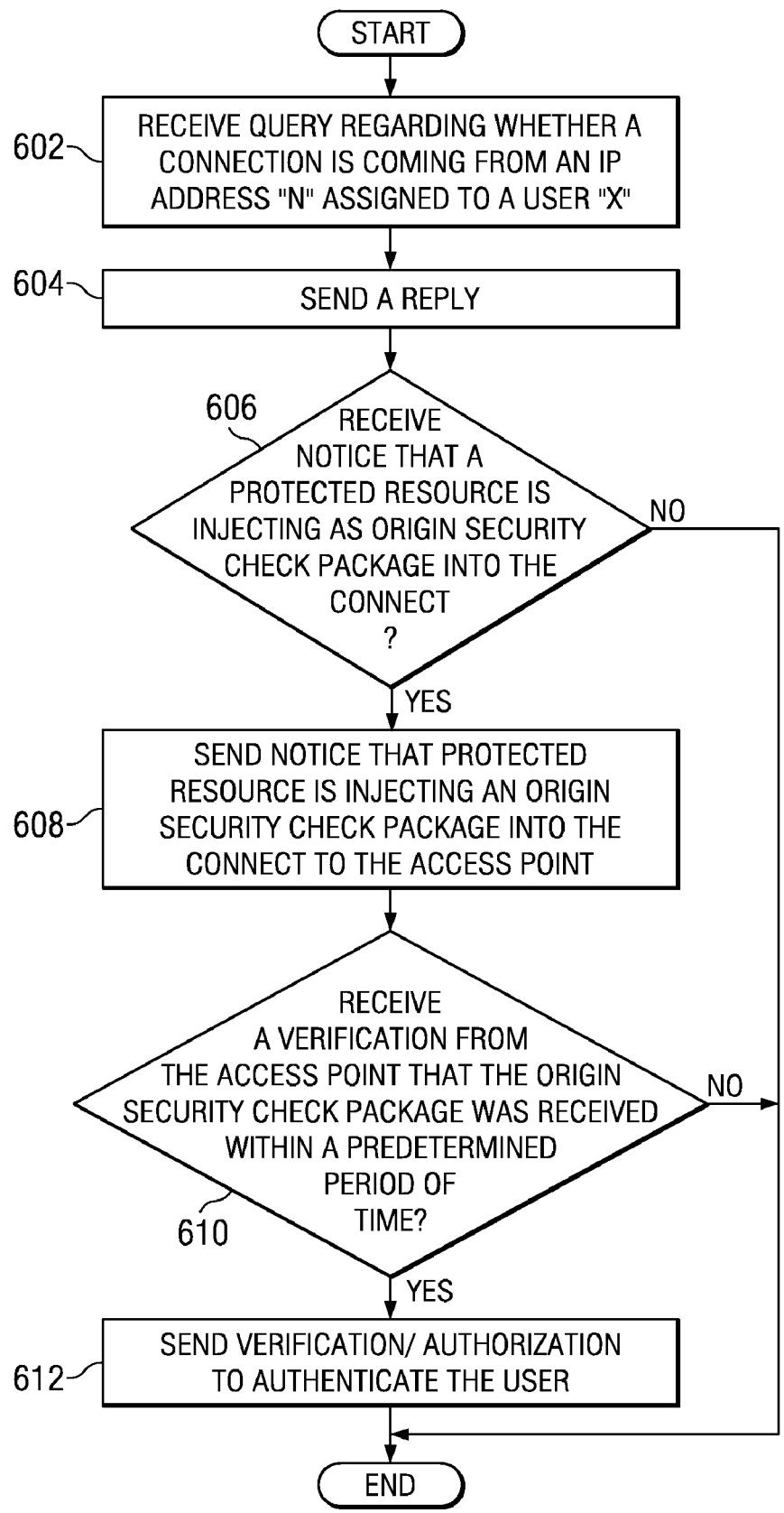
FIG. 6 is a flowchart illustrating a process for verifying a security origin check by an authentication server in accordance with an illustrative embodiment.

FIG. 6 is a flowchart illustrating a process for verifying a security origin check by an authentication server in accordance with an illustrative embodiment. In this illustrative example shown in FIG. 6, the process is performed by a software component for providing access to a network, such as access point 302 of FIG. 3 and/or access point 404 in FIG. 4.

The process begins by receiving a query from a protected resource regarding whether a network connection utilized by a user "X" requesting access to the protected resource, is coming from an IP address "N" assigned to the user "X" (step 602). The process sends a reply (step 604). In other words, if the process determines that the IP address "N" is assigned to user "X" and the connection utilized by user "X" is coming from the IP address "N", the process sends a reply confirming that the connection is coming from IP address "N" assigned to user "X". If the process cannot confirm that the connection is coming from IP address "N" assigned to user "X", the process sends a reply to the protected resource stating the same.

Next, the process makes a determination as to whether a notice is received stating that a protected resource is injecting an origin security check package into a network connection being utilized by a user (step 606). For example, the origin security check package may be a unique bit sequence. If a notice is not received, the process terminates thereafter.

If a notice is received, the process sends a notice to an access point for the network stating that a protected resource is injecting an origin security check package into a network connection being utilized by a user (step 608). The process makes a determination as to whether verification is received from the access point verifying that the origin security check package was received within a predetermined period of time (step 610). If the verification is not received, the process terminates thereafter.

Returning to step 610, if a verification is received, the process sends a verification or authorization to the protected resource to authenticate the user (step 612), with the process terminating thereafter. When the user is authenticated, the protected resource will allow the user to access the protected resource.

Figure 7:
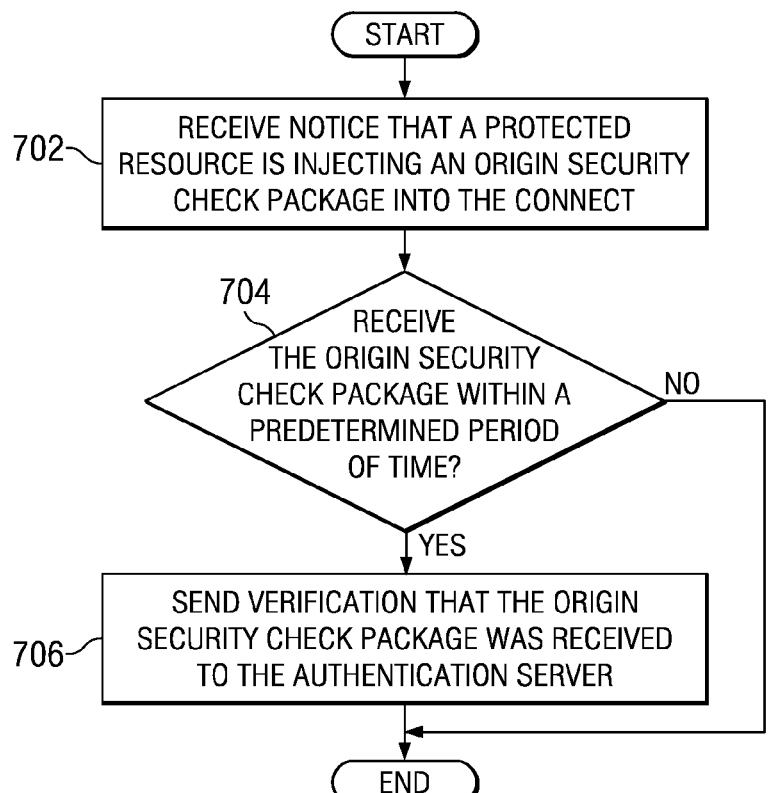
FIG. 7 is a flowchart illustrating a process for responding to a security origin check by an access point in accordance with an illustrative embodiment.

FIG. 7 is a flowchart illustrating a process for responding to a security origin check by an access point in accordance with an illustrative embodiment. In this illustrative example shown in FIG. 7, the process is performed by a software component for authenticating a user, such as authentication server 306 in FIG. 3 and/or authentication server 414 in FIG. 4.

The process begins by receiving a notice from an authentication server that a protected resource is injecting an origin security check package into the network connection used by a user requesting access to the protected resource (step 702). The origin security check package may be any unique bit sequence.

Next, the process makes a determination as to whether the origin security check package is received within a predetermined period of time (step 704). In other words, the process monitors the network connection for the origin security check package for the predetermined period of time. If the origin security check package is not received within the predetermined period of time, the process terminates thereafter. If the origin security check package is received within the predetermined period of time, the process sends verification that the origin security check package was received to the authentication server (step 706), with the process terminating thereafter.

Figure 8:
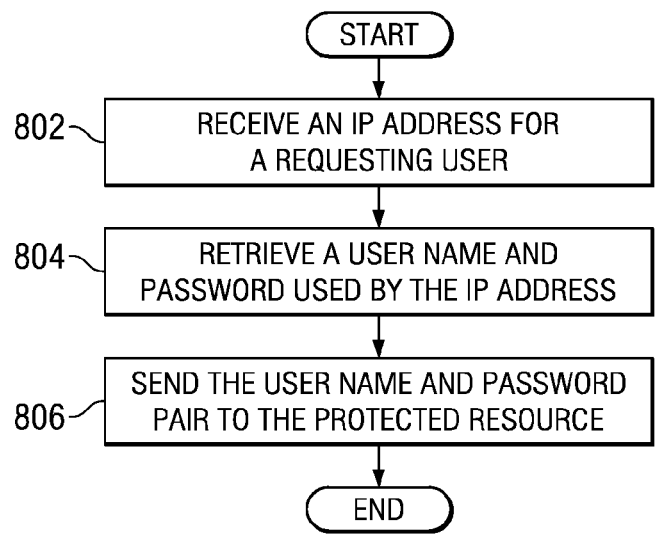
FIG. 8 is a flowchart illustrating a process for a single sign-on authentication by an authentication server in accordance with an illustrative embodiment.

Turning now to FIG. 8, a flowchart illustrating a process for a single sign-on authentication by an authentication server in accordance with an illustrative embodiment. In this illustrative example shown in FIG. 8, the process is performed by a software component for authenticating a user, such as authentication server 306 in FIG. 3 and/or authentication server 414 in FIG. 4.

The process begins by receiving an IP address for a user requesting access to a protected resource (step 802). The IP address may be sent to the authentication server in a query from the protected resource or from a resource protection point.

Next, the process retrieves a user name and password pair used by the IP address (step 804). The authentication server saves the user name and password pair used by the IP address when the user is originally authenticated during a primary RADIUS authentication.

The process sends the user name and password pair to the protected resource (step 806), with the process terminating thereafter. In another embodiment, the process sends the user name and password pair to the resource protection point. The resource protection point and/or protected resource use the user name and password pair in the resource protection point and/or protected resource's own authentication mechanisms.

Figure 9:
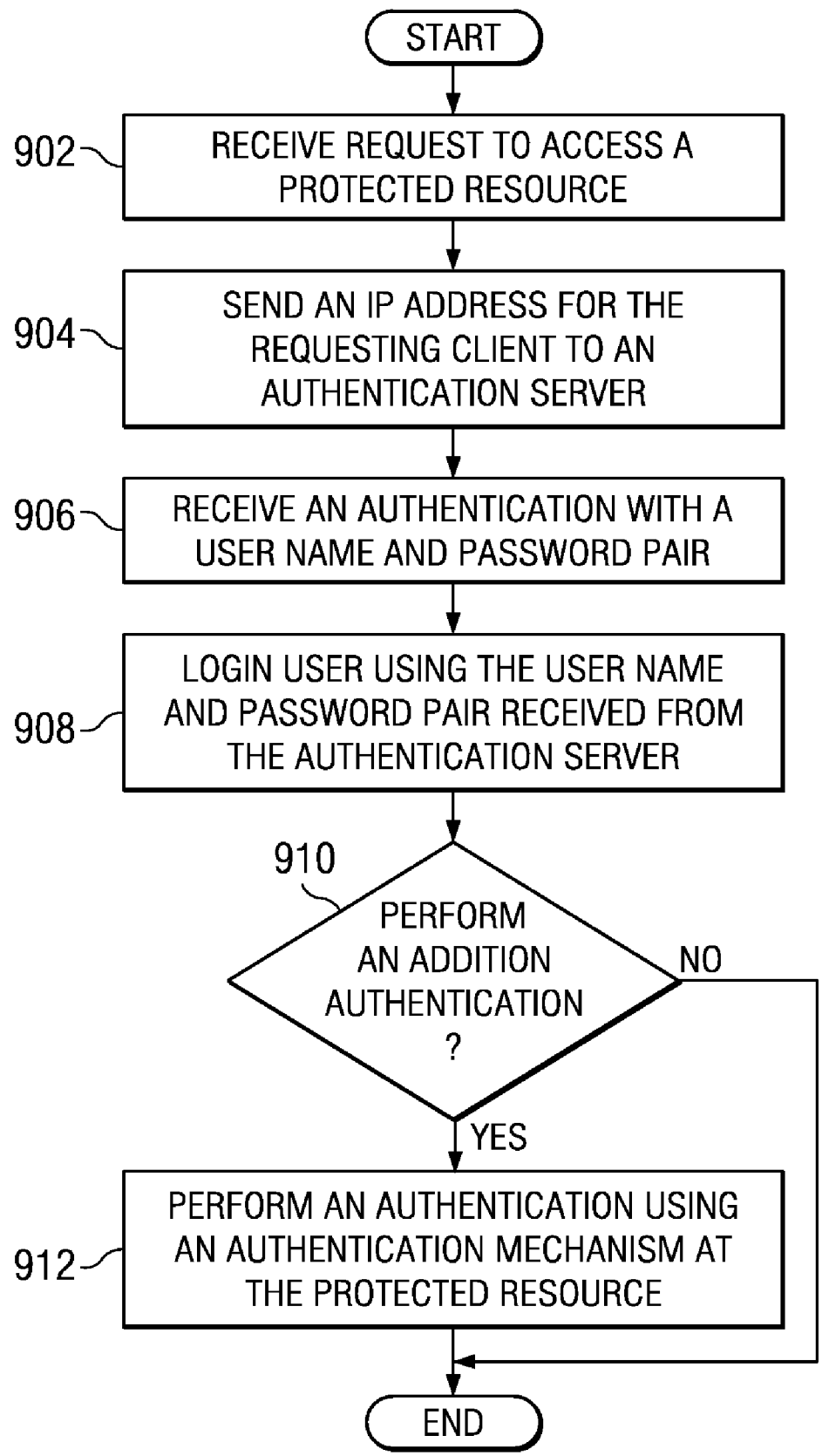
FIG. 9 is a flowchart illustrating a process for a single sign-on authentication request in accordance with an illustrative embodiment.

FIG. 9 is a flowchart illustrating a process for a single sign-on authentication request in accordance with an illustrative embodiment. In this illustrative example shown in FIG. 9, the process is performed by a software component for protecting access to a resource, such as protected resource 320 or resource protection point 322 in FIG. 3, or protected resource 410 in FIG. 4.

The process begins by receiving a request to access a protected resource (step 902). The process sends an IP address for the client requesting access to the protected resource to an authentication server (step 904).

Next, the process receives a user name and password pair from the authentication server (step 906). The process performs a login of the user using the user name and password pair received from the authentication server (step 908). In other words, the process does not prompt a user to enter a user name and password. Instead, the process uses the user name and password received from the authentication server to authenticate the user.

The process makes a determination as to whether to perform an additional authentication (step 910). If the process does not perform an additional authentication, the process terminates thereafter.

Returning to step 910, if the process does make an additional authentication, the process performs an additional authentication using an authentication mechanism of the protected resource (step 912) with the process terminating thereafter. The process may use the user name and password received from the authentication server for the authentication mechanism. In another embodiment, the process may prompt the user to enter a user name and password for use in the authentication mechanism to authenticate the user.

Thus, the illustrative embodiments provide computer implemented method, apparatus, and computer program product for authenticating a user to a network. In one embodiment, the protected resource sends an origin security check package into a network connection utilized by the user in response to receiving a request from a user to access a protected resource. Next, the protected resource authenticates the user and allows the user to access the protected resource in response to receiving a verification that the origin security check package was received by an access point that authenticated the user when the user logged on to the network.

In this manner, the illustrative embodiments provide a RADIUS security origin check (RSOC) that permits any protected resource to query a RADIUS server for authentication of a user. The protected resource can inform the RADIUS server that a user is about to login to the protected resource and request authentication of the user.

The illustrative embodiments permit a protected resource to authenticate the user based on an origin of the user's network connection. Thus, in the illustrative embodiments, a RADIUS server can not only authenticate a user to a network, but the RADIUS server can also ensure that any access of a protected resource by the user is originating from a correct network access port, even when a user telnets to multiple different protected resources.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for authenticating a user to a network, the computer implemented method comprising:
    authenticating by an authentication server a computing device used by the user that is connected to the network through an access point based on received login information;
    assigning by the authentication server a unique Internet protocol address to the authenticated computing device that uniquely identifies the authenticated computing device;
    responsive to receiving by a protected resource protected by a resource protection point device that is separate from the authentication server a request from the user to access the protected resource, identifying by the protected resource protected by the resource protection point device that is separate from the authentication server an Internet protocol address for a network connection utilized by the user to connect to the network;
    sending by the protected resource protected by the resource protection point device that is separate from the authentication server via the network a unique bit sequence having a random sequence of bits with a bit length equal to a length of a maximum transmission unit for a connection stream into the network connection utilized by the user;
    confirming by the access point that the network connection utilized by the user to connect to the network is originating from the assigned Internet protocol address associated with the authenticated computing device based on a determination by the access point that the unique bit sequence having the random sequence of bits with the bit length equal to the length of the maximum transmission unit for the connection stream was detected heading toward the authenticated computing device associated with the assigned Internet protocol address utilized by the user; and
    responsive to receiving by the authentication server a verification from the access point that the unique bit sequence having the random sequence of bits with the bit length equal to the length of the maximum transmission unit for the connection stream sent from the protected resource protected by the resource protection point device that is separate from the authentication server via the network was received by the access point for the authenticated computing device associated with the assigned Internet protocol address used by the user when the user logged on to the network, authenticating by the authentication server the user to access the protected resource protected by the resource protection point device that is separate from the authentication server.

2. The computer implemented method of claim 1 further comprising:
    sending by the protected resource protected by the resource protection point device that is separate from the authentication server a query to the authentication server that requests confirmation that the network connection is originating from the assigned Internet protocol address associated with the authenticated computing device.

3. The computer implemented method of claim 1 further comprising:
    sending by the protected resource protected by the resource protection point device that is separate from the authentication server a first notice to the authentication server that the protected resource is injecting the unique bit sequence having the random sequence of bits with the bit length equal to the length of the maximum transmission unit for the connection stream into the network connection utilized by the user to connect to the network.

4. The computer implemented method of claim 3 further comprising:
    sending by the authentication server a second notice to the access point that the protected resource protected by the resource protection point device that is separate from the authentication server is injecting the unique bit sequence having the random sequence of bits with the bit length equal to the length of the maximum transmission unit for the connection stream into the network connection utilized by the user to connect to the network.

5. The computer implemented method of claim 1, wherein confirming by the access point that the network connection utilized by the user to connect to the network is originating from the assigned Internet protocol address associated with the authenticated computing device based on a determination by the access point that the unique bit sequence having the random sequence of bits with the bit length equal to the length of the maximum transmission unit for the connection stream was detected heading toward the authenticated computing device associated with the assigned Internet protocol address utilized by the user further comprises:
    sending by the access point a message verifying an origin of the network connection utilized by the user to the authentication server.

6. The computer implemented method of claim 5 further comprising:
    responsive to receiving by the authentication server the message verifying the origin of the network connection utilized by the user from the access point, sending by the authentication server an authentication of the user to the protected resource protected by the resource protection point device that is separate from the authentication server.

7. The computer implemented method of claim 6, wherein the authentication is the verification that the unique bit sequence having the random sequence of bits with the bit length equal to the length of the maximum transmission unit for the connection stream was received from the protected resource protected by the resource protection point device that is separate from the authentication server via the network by the access point for the authenticated computing device associated with the assigned Internet protocol address utilized by the user when the user logged on to the network.

8. A computer program product stored on a non-transitory computer usable medium including computer usable program code embodied thereon for authenticating a user to a network, said computer program product comprising:
    computer usable program code for authenticating by an authentication server a computing device used by the user that is connected to the network through an access point based on received login information;
    computer usable program code for assigning by the authentication server a unique Internet protocol address to the authenticated computing device that uniquely identifies the authenticated computing device;

computer usable program code for identifying by a protected resource protected by a resource protection point device that is separate from the authentication server an Internet protocol address for a network connection utilized by the user to connect to the network in response to receiving by the protected resource protected by the resource protection point device that is separate from the authentication server a request from the user to access the protected resource;

computer usable program code for sending by the protected resource protected by the resource protection point device that is separate from the authentication server via the network a unique bit sequence having a random sequence of bits with a bit length equal to a length of a maximum transmission unit for a connection stream into the network connection utilized by the user;

computer usable program code for confirming by the access point that the network connection utilized by the user to connect to the network is originating from the assigned Internet protocol address associated with the authenticated computing device based on a determination by the access point that the unique bit sequence having the random sequence of bits with the bit length equal to the length of the maximum transmission unit for the connection stream was detected heading toward the authenticated computing device associated with the assigned Internet protocol address utilized by the user; and computer usable program code for authenticating by the authentication server the user to access the protected resource protected by the resource protection point device that is separate from the authentication server in response to receiving by the authentication server a verification from the access point that the unique bit sequence having the random sequence of bits with the bit length equal to the length of the maximum transmission unit for the connection stream sent from the protected resource protected by the resource protection point device that is separate from the authenticated computing device associated with the assigned Internet protocol address used by the user when the user logged on to the network.

9. A system for authenticating a user to a network, the system comprising:

an authentication server, wherein the authentication server authenticates a computing device used by the user that is connected to the network through an access point based on received login information, and wherein the authentication server assigns a unique Internet protocol address to the authenticated computing device that uniquely identifies the authenticated computing device; and a protected resource protected by a resource protection point device that is separate from the authentication server, wherein the protected resource protected by the resource protection point device that is separate from the authentication server identifies an Internet protocol address for a network connection utilized by the user to connect to the network in response to receiving by the protected resource protected by the resource protection point device that is separate from the authentication server a request from the user to access the protected resource, and wherein the protected resource protected by the resource protection point device that is separate from the authentication server sends via the network a unique bit sequence having a random sequence of bits with a bit length equal to a length of a maximum transmission unit for a connection stream into the network connection utilized by the user, and wherein the access point confirms that the network connection utilized by the user to connect to the network is originating from the assigned Internet protocol address associated with the authenticated computing device based on a determination by the access point that the unique bit sequence having the random sequence of bits with the bit length equal to the length of the maximum transmission unit for the connection stream was detected heading toward the authenticated computing device associated with the assigned Internet protocol address utilized by the user, and wherein the authentication server authenticates the user to access the protected resource protected by the resource protection point device that is separate from the authentication server in response to receiving by the authentication server a verification from the access point that the unique bit sequence having the random sequence of bits with the bit length equal to the length of the maximum transmission unit for the connection stream sent from the protected resource protected by the resource protection point device that is separate from the authentication server via the network was received by the access point for the authenticated computing device associated with the assigned Internet protocol address used by the user when the user logged on to the network.

10. The system of claim 9, wherein the access point detects the unique bit sequence having the random sequence of bits with the bit length equal to the length of the maximum transmission unit for the connection stream sent from the protected resource protected by the resource protection point device that is separate from the authentication server heading for the authenticated computing device from the protected resource.

11. The system of claim 10, wherein the authentication server verifies that the user is an authorized user if the unique bit sequence having the random sequence of bits with the bit length equal to the length of the maximum transmission unit for the connection stream is detected by the access point moving toward the authenticated computing device corresponding to the assigned Internet protocol address utilized by the user.

* * * * *